3,539,628
DERIVATIVES OF ACETIC ACID
Rudolf G. Griot, Florham Park, N.J., assignor to
Sandoz-Wander, Inc., a corporation of Delaware
No Drawing. Filed June 4, 1968, Ser. No. 734,227
Int. Cl. C07c 103/26
U.S. Cl. 260—559     3 Claims

ABSTRACT OF THE DISCLOSURE

This disclosure relates to derivatives of acetic acid, e.g., bis(p-biphenylyloxy)acetamide. These compounds are useful as hypocholesteremics/hypolipidemics.

---

This invention relates to derivatives of acetic acid. In particular, the invention pertains to bis(aryloxy)acetic acid amides which possess hypocholesteremic-hypolipidemic activity. The invention further relates to pharmaceutical compositions containing the above compounds as active ingredient thereof and the use of such compositions for the treatment of hypercholesteremia-hyperlipemia.

The novel compounds of the present invention are of the structural formula

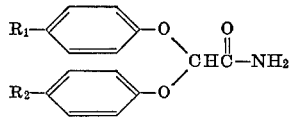
(I)

wherein each of $R_1$ and $R_2$, independently, represents H, phenyl or trifluoromethyl, provided at least one of $R_1$ and $R_2$ is other than H.

The preferred compounds of Formula I are those wherein both $R_1$ and $R_2$ are trifluoromethyl or both $R_1$ and $R_2$ are phenyl.

The processes useful in preparation of the acetic acid amides of Formula I are set out below.

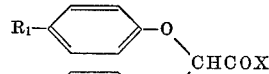
(II)

or + $NH_3$ ⟶

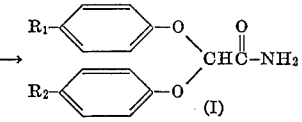
(I)

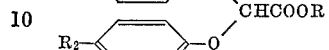
(III)

where:

$R_1$ and $R_2$, are as earlier defined,

R represents H; or lower alkyl, straight or branched chain and preferably containing from 1 to 6 carbon atoms, e.g., methyl, ethyl, propyl, isopropyl, butyl, t-butyl, pentyl and hexyl; and X represents halo, preferably bromo or chloro.

The acetyl halide (II) is converted to the corresponding compound of Formula I by treatment with ammonia in solvent such as benzene, toluene, chloroform, and the like. The reaction is readily conducted at a temperature of from about minus 10° to 40° C., preferably 0°–20° C.

Alternatively, the acetamides (I) may be prepared from the compounds of Formula III by treating the latter in solvent such as loweralkanol (e.g., ethanol), benzene, toluene and the like with ammonia at a temperature of from about 0° C. to about 50° C., preferably at about room temperature.

In the above described processes, neither the solvent nor the temperature used is critical in obtaining the compounds (I).

The starting materials (II) and (III) for the above processes are prepared according to several procedures which may be classified generally into the following two categories: (1) those permitting the obtaining of the compounds of Formulae II and III wherein both $R_1$ and $R_2$ are the same, and (2) those procedures whereby there may be obtained compounds of Formulae II and III wherein $R_1$ and $R_2$ are dissimilar. Some of the processes fit both categories. Processes A through F, inclusive, may be used to provide bis(substitutedphenoxy)acetic acid derivatives having two different types of substituents on the aromatic nuclei. These various procedures may be represented as follows.

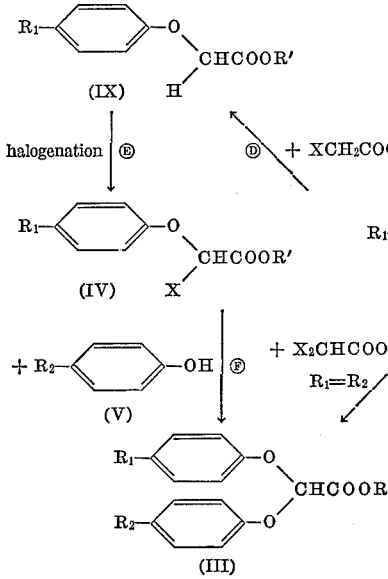

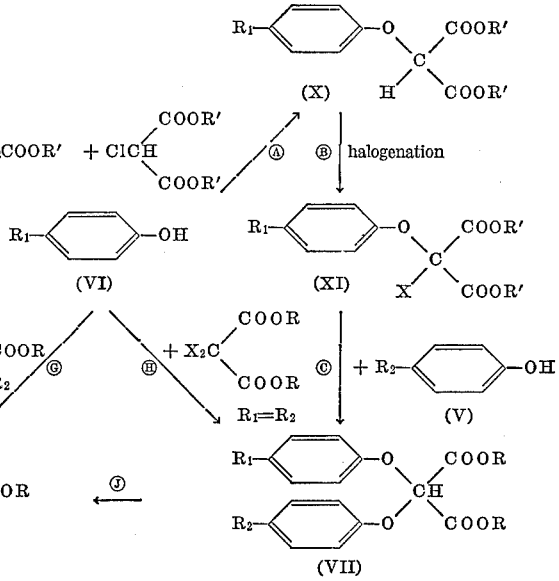

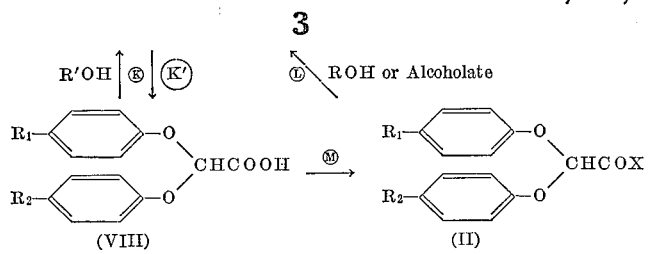

$R_1$, $R_2$, R and X are as defined above, and R' represents lower alkyl.

Method F pertains to the reaction of a substituted phenoxy halo acetic acid ester (IV) and an appropriately substituted phenol (V) as the phenolate. This reaction is conveniently effected in a suitable inert organic solvent such as dimethylacetamide; diethylacetamide; dimethylformamide; and tetramethylurea. Preferably, the reaction is initially carried out at room temperature and then allowed to continue at elevated temperatures up to about 80° C. The particular solvent employed is not critical, nor is the temperature employed critical provided it does not exceed about 80° C. The resulting acetic acid ester (III) is readily recovered employing conventional techniques. The substituted phenol (V) is readily converted to the phenolate using standard techniques, such as treating the phenol with either a strong alkali metal hydroxide, e.g., KOH or NaOH, and water or sodium hydride in dimethylacetamide.

Method G involves the reaction of the substituted phenol (VI) as a phenolate and a dihalocarboxylic acid ester or free acid and the solvents and temperatures which may be used are substantially as discussed with respect to method F.

The process above identified as method J is conducted by treating an appropriately substituted malonic acid ester or free acid (VII) with an alcohol or alcoholate desirably in a suitable inert organic solvent, e.g., benzene, toluene and xylene, and in the presence of an alkali metal alkoxide, such as sodium methoxide and sodium ethoxide. The reaction is conveniently carried out at an elevated temperature, preferably at reflux temperature of the system. The resulting intermediate product (III) is readily recovered in a conventional manner.

Alternatively, the compounds of Formula II may be prepared according to process L above by reacting an appropriate bis(substituted phenoxy)acetyl halide (II), such as the acetyl chloride, with an appropriate alcohol or alcoholate. The preparation of the acetyl chloride (method M) and subsequent reaction thereof with alcohols are performed by methods analogous to those described in the literature. When an alcoholate is used instead of the free alcohol, it is generally preferred to carry out the reaction in a suitable inert organic solvent such as absolute diethyl ether. Such reaction is highly exothermic, and it is desirable to maintain the reaction temperature at about 20°–30° C. This procedure utilizing an alcoholate is particularly suitable for the preparation of those compounds of Formula III wherein R is a tertiary loweralkyl, e.g., t-butyl and t-pentyl.

The compound of Formula III may also be prepared according to process K above. This simple esterification may be carried out by treating a substituted bis-phenoxyacetic acid (VIII) with an appropriate alcohol in a conventional manner. The esterification may be conducted at room temperature or at elevated temperatures. Preferably, it is conducted at reflux temperature and in the presence of a catalytic amount of hydrogen ions such as may be supplied by the use of an arylsulfonic acid, e.g., benzenesulfonic acid, p-toluenesulfonic acid and the like. The use of a solvent is not necessary since an excess of alcohol may be used for that purpose. The resulting intermediate product (III) is readily recovered in a conventional manner.

Compounds of Formula III where R represents lower alkyl are converted as indicated by process $K^1$ to the acetic acid derivative of Formula VIII by conventional hydrolysis, such as by treatment with alkali metal hydroxide, and conversion of the resulting salt with strong mineral acid, e.g., HCl, to the acid (VIII).

The substituted phenoxy haloacetic acid ester starting materials (IV) used for process F described above may be prepared as indicated according to processes D and E. Method D concerns treatment of the phenolate of compound (VI) with a monohaloacetic acid, e.g., chloro acetic acid, to obtain the substituted phenoxy acetic acid of Formula IX. The same solvents and reaction conditions discussed respecting processes F and G apply here as well. The compounds of Formula IX are then halogenated to provide the compounds of Formula IV (method E). Conventional halogenating agents may be employed. The preferred agent is bromine or chlorine although other agents such as N-bromosuccinimide or sulfuryl chloride can also be used. The halogenation is conveniently carried out in a suitable inert organic solvent such as a halocarbon, for instance a chloroalkane, e.g., dichloromethane, chloroform, carbontetrachloride, and the like. Preferably, the reaction is initially carried out at room temperature and then allowed to continue at reflux temperature. However, neither the choice of solvent nor the temperature used is critical.

The starting compounds of Formula VII which are utilized in method J, discussed above, may be prepared by treating the phenolate of the compound of Formula VI with a dihalomalonic acid ester under the same conditions and with the same solvents as described for the reaction of the dihaloacetic acid esters utilized in process G. The bis(substituted phenoxy)malonic acid esters of Formula VII are also prepared by treating a phenolate of the compounds of Formula VI with a chloromalonic acid ester to provide the corresponding substituted malonic acid ester derivative (X) (method A). The temperature and solvents used for method F may be utilized. The compounds of Formula X are then halogenated (method B) in a manner as earlier discussed with respect to process E, and the resulting substituted phenoxy halomalonic acid ester (XI) is treated with a phenolate of the compounds of Formula V (process C) to provide starting compounds (VII) which is loweralkyl by utilizing the solvents and reaction conditions indicated hereinabove for process F.

Various of the phenolates and acetic acid and malonic acid derivatives employed as reactants above are known and are prepared according to methods disclosed in the literature. Those others not specifically described in the literature are prepared by analogous methods from known materials.

It should be understood that in each of processes G, H and J, it is preferred that R represent lower alkyl since use of the free acid tends to lower the yield of intermediate product (III).

As previously indicated, the compounds of Formula I are useful because they possess pharmacological properties in animals. In particular these compounds are useful as hypocholesteremics/hypolipidemics, as indicated by their activity in sodium hexobarbital anesthetized rat fed a diet containing active compound ad libitum for 10 days and tested by extracting serum or plasma with isopropanol and noting the cholesterol content. For such usage, the compounds may be administered orally as such or admixed with conventional pharmaceutical carriers or administered orally in such forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents, such as calcium carbonate, sodium carbonate, lactose and talc, granulating and disintegrating agents, e.g., starch and alginic acid, binding agents, e.g., starch gelatin and acacia, and lubricating agents, e.g, magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxethylene sorbitan monooleate) and preservatives (ethyl-p-hydroxybenzoate). Capsules may contain the active ingredient alone or admixed with an inert solid diluent, e.g., calcium carbonate, calcium phosphate and kaolin.

The dosage of active ingredient employed for the alleviation of hyperlipemia (hypocholesteremia) may vary depending on the particular compound employed and the severity of the condition being treated. In general, satisfactory results are obtained when these compounds are administered at a daily dosage of from about .5 milligram to about 50 milligrams per kilogram of animal body weight. This daily dosage is preferably given in divided doses and administered 2–4 times a day, or in sustained release form. For most large mammals, the total daily dosage is from about 50–2000 mg., and dosage forms suitable for internal use comprise from about 12.5 milligrams to about 500 milligrams of active compound in intimate admixture with a solid or liquid pharmaceutically acceptable carrier or diluent. The preferred pharmaceutical compositions from the standpoint of preparation and ease of administration are solid compositions, particularly hard-filled capsules and tablets containing from 25 milligrams to about 250 milligrams of the active ingredient.

The following examples serve to further illustrate the present invention. However, it is to be understood that the examples are for purposes of illustration only and are not intended as in any way limiting the scope of the invention which is defined in the appended claims.

EXAMPLE 1

Bis(p-biphenylyloxy)acetamide

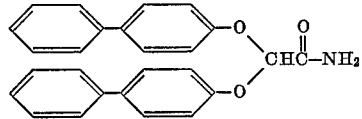

Bis(p-biphenylyloxy)acetic acid methyl ester (38 g.) in 200 ml. of toluene is saturated with ammonia by bubbling the ammonia through the solution at room temperature. The reaction mixture is allowed to stand overnight. The product precipitates as a crystalline solid having a melting point of 184° C.–185.5° C.

When the above process is carried out and (p-trifluoromethylphenoxy)-phenoxy acetic acid ethyl ester is used in place of bis(p-biphenylyloxy)acetic acid methyl ester, there is obtained (p-trifluoromethylphenoxy)-phenoxy acetamide.

EXAMPLE 2

Bis-(p-trifluoromethylphenoxy)acetamide

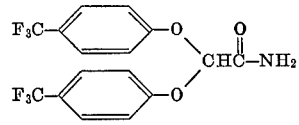

A solution of 33.2 gm. of bis(p-trifluoromethylphenoxy)acetyl chloride in 50 ml. of absolut diethyl ether is treated by bubbling ammonia into it at a temperature of about 15° C. The reaction mixture is allowed to stand overnight and the product, bis(p-trifluoromethylphenoxy)acetamide, precipitates.

When the above process is carried out and bis(p-biphenylyloxy)acetyl chloride is used in place of bis(p-trifluoromethylphenoxy) acetyl chloride, there is obtained bis(p-biphenylyloxy)acetamide; M.P. 184°–185.5° C.

EXAMPLE 3

Tablets

Tablets suitable for oral administration and containing the following ingredients are prepared by conventional tabletting techniques.

| Ingredient: | Weight (mg.) |
| --- | --- |
| Bis(p-biphenylyloxy)acetamide | 250 |
| Tragacanth | 10 |
| Lactose | 197.5 |
| Corn starch | 25 |
| Talcum | 15 |
| Magnesium stearate | 2.5 |

The tablets so prepared are useful in the treatment of hypercholesteremia at a dose of one tablet, 2 to 4 times a day.

EXAMPLE 4

Dry filled capsules

Capsules suitable for oral administration containing the following ingredients are prepared in conventional manner.

| Ingredient: | Weight (mg.) |
| --- | --- |
| Bis(p-biphenylyloxy)acetamide | 250 |
| Inert solid diluent (starch, lactose, or kaolin) | 250 |

The capsules so prepared are useful in the treatment of hypercholesteremia at a dose of one capsule, 2 to 4 times a day.

What is claimed is:

1. A compound of the formula

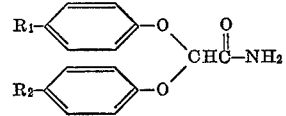

where each of $R_1$ and $R_2$, independently, represents H, phenyl or trifluoromethyl, provided that one of $R_1$ and $R_2$ is other than H.

2. The compound of claim 1 which is bis(p-biphenylyloxy)acetamide.

3. The compound of claim 1 which is bis(p-trifluoromethylphenoxy)acetamide.

References Cited

UNITED STATES PATENTS 3,325,488   6/1967   Lafon  _____ 260—559

HENRY R. JILES, Primary Examiner

H. I. MOATZ, Assistant Examiner

U.S. Cl. X.R.

424—324